United States Patent
Slusar et al.

(10) Patent No.: US 12,153,190 B2
(45) Date of Patent: Nov. 26, 2024

(54) INTELLIGENT STRUCTURAL PROTECTION SYSTEMS AND METHODS

(71) Applicant: Allstate Insurance Company, Northbrook, IL (US)

(72) Inventors: Mark Slusar, Northbrook, IL (US); Nilesh Malpekar, Northbrook, IL (US); Anna Reifman, Northbrook, IL (US); Gabriel Federico Carballo Nunez, Northbrook, IL (US); Meg G. Walters, Northbrook, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 17/696,421

(22) Filed: Mar. 16, 2022

(65) Prior Publication Data
US 2023/0296804 A1 Sep. 21, 2023

(51) Int. Cl.
*G01W 1/10* (2006.01)
*G01S 19/14* (2010.01)
(Continued)

(52) U.S. Cl.
CPC ............... *G01W 1/10* (2013.01); *G01S 19/14* (2013.01); *G06F 30/27* (2020.01); *G06N 3/08* (2013.01);
(Continued)

(58) Field of Classification Search
CPC ..... G01W 1/10; G01W 2203/00; G01S 19/14; G06F 30/27; G06N 3/08; G06N 20/00; G06N 3/02; G05B 13/027; G05B 13/02
See application file for complete search history.

(56) References Cited

U.S. PATENT DOCUMENTS

| | | | |
|---|---|---|---|
| 6,088,975 A | 7/2000 | Wiegel | |
| 6,935,674 B1 * | 8/2005 | Campos | B60J 11/00 296/136.12 |

(Continued)

FOREIGN PATENT DOCUMENTS

| | | |
|---|---|---|
| CN | 204978197 U | 1/2016 |
| CN | 205890842 U | 1/2017 |

(Continued)

OTHER PUBLICATIONS

Storms Shutters and Shades (Options—Screen Colors, Remotes, Hoods, Mounts & Configurations, Storms Shutters and Shades, https://web.archive.org/web/20211209081136/https://stormshuttersandshades.com/options/, Dec. 9, 2021 ) (Year: 2021).*

*Primary Examiner* — Manish S Shah
*Assistant Examiner* — Christian T Bryant
(74) *Attorney, Agent, or Firm* — Dinsmore & Shohl LLP

(57) ABSTRACT

Systems and methods for deployment of a protective component, generation of a customized design for the protective component, or combinations thereof are associated with a structure comprising a portion, a neural network model, processor(s), and memory storing machine readable instructions. When executed for deployment, the neural network model predicts the likelihood of the occurrence of the natural event in the geographic area within the time frame as high as defined by when the likelihood is above a threshold, and deploys the protective component for protecting the portion of the structure when the likelihood is high. For customized design, the neural network model is used to access dimension and weather data associated with a structure and weather data to generate the customized design of the protective component for the structure.

14 Claims, 6 Drawing Sheets

(51) Int. Cl.
  *G05B 13/02* (2006.01)
  *G06F 30/27* (2020.01)
  *G06N 3/02* (2006.01)
  *G06N 3/08* (2023.01)
  *G06N 20/00* (2019.01)

(52) U.S. Cl.
  CPC ......... *G01W 2203/00* (2013.01); *G05B 13/02* (2013.01); *G05B 13/027* (2013.01); *G06N 3/02* (2013.01); *G06N 20/00* (2019.01)

(56) References Cited

U.S. PATENT DOCUMENTS

| | | | |
|---|---|---|---|
| 2017/0088237 A1* | 3/2017 | Shearer | B63B 17/02 |
| 2021/0125477 A1* | 4/2021 | Kelly | G08B 19/00 |
| 2021/0294172 A1* | 9/2021 | Rasmus-Vorrath | E06B 9/24 |

FOREIGN PATENT DOCUMENTS

| | | | | |
|---|---|---|---|---|
| CN | 106613506 A | | 5/2017 | |
| CN | 206254776 U | | 6/2017 | |
| CN | 107893602 A | * | 4/2018 | ............ E05D 13/00 |
| CN | 207737103 U | | 8/2018 | |
| IN | 201911053329 A | * | 10/2020 | |

* cited by examiner

INTELLIGENT STRUCTURAL PROTECTION SYSTEMS AND METHODS

TECHNICAL FIELD

The present disclosure relates to intelligent structural protection systems and methods and, in particular, to intelligent structural protection systems and methods to deploy a protective component in relation to a structure, to generate a customized design of a protective component for enclosing and protecting a portion of a structure, or combinations thereof.

BACKGROUND

Insurance companies often disburse funds to owners of various types of properties when these owners suffer property damage. Insurance companies may utilize sophisticated mathematical modeling techniques to estimate the premiums that should be charged for such property protection to manage costs and maximize profitability. However, conventional techniques are reactive rather than preventative.

Accordingly, a need exists to reduce costs and mitigate damage to different types of properties.

BRIEF SUMMARY

According to the subject matter of the present disclosure, an intelligent structural protection system comprises a structure comprising a portion, a protection component, one or more processors, and one or more memory components communicatively coupled to the one or more processors, and machine readable instructions stored in the one or more memory components. The machine readable instructions stored in the one or more memory components cause the intelligent structural protection system to perform at least the following when executed by the one or more processors: access weather data within a geographic area in which the structure is located, determine, using an artificial intelligence neural network trained model and based on the weather data, a likelihood of an occurrence of a natural event in the geographic area within a time frame, and compare the likelihood of the occurrence of the natural event in the geographic area within the time frame to a threshold. The machine readable instructions further cause the intelligent structural protection system to perform at least the following when executed by the one or more processors: predict the likelihood of the occurrence of the natural event in the geographic area within the time frame as high as defined by when the likelihood is above the threshold, and deploy, during the time frame, the protective component for protecting the portion of the structure when the likelihood of the natural event is high.

According to another embodiment, a method for deployment of a protective component in relation to a structure comprises accessing weather data within a geographic area in which the structure is located, determining, using an artificial intelligence neural network trained model and based on the weather data, a likelihood of an occurrence of a natural event in the geographic area within a time frame, and comparing the likelihood of the occurrence of the natural event in the geographic area within the time frame to a threshold. The method further comprises predicting the likelihood of the occurrence of the natural event in the geographic area within the time frame as high as defined by when the likelihood is above the threshold, and deploying, during the time frame, the protective component for protecting a portion of the structure when the likelihood of the natural event is high.

According to another embodiment, a method for generating a customized design of a protective component for a structure comprises accessing, from one or more databases, dimensions data of the structure and historical weather data associated with a geographic area in which the structure is located, analyzing, and using a machine learning trained model on the computing device, the dimensions data of the structure and the historical weather data associated with the geographic area. The method further comprises predicting, using the machine learning trained model, design characteristics of the protective component based on the analyzing, and generating, using the machine learning trained model, the customized design for the structure that is configured for protecting at least the portion of the structure.

Although the concepts of the present disclosure are described herein with primary reference to an insurance solution, it is contemplated that the concepts will enjoy applicability to any setting for purposes of intelligent solutions, such as other business settings or otherwise.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
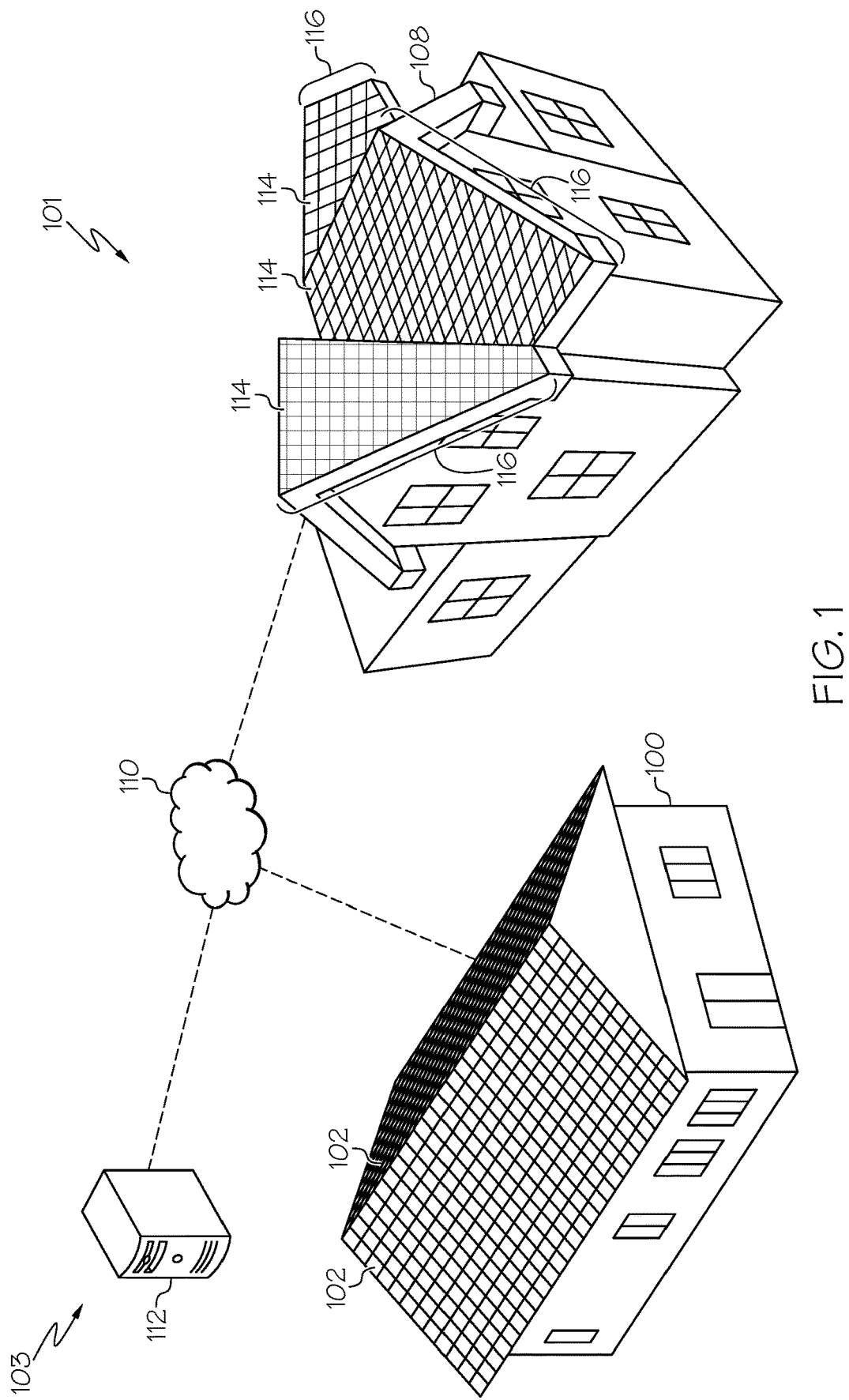
FIG. 1 illustrates a schematic view of an intelligent structural protection solution including a protective component for a structure, according to one or more embodiments described and illustrated herein.

In embodiments described herein and in greater detail below, an intelligent structural protection system is configured to implement an intelligent structural protection solution using one or more computing devices. In an aspect, the embodiments herein are directed to the functionality of an intelligent structural protection system that is configured to utilize an artificial intelligence neural network trained model to generate a customized design of a protective component for a structure, such as in the form of two dimensional or three dimensional renderings of the protective component. The renderings may also include a plurality of customized designs appearing over one or more portions of the structure. Alternatively or additionally, the intelligent structural protection system is configured to control a real-world operation of a protective component that is installed on a portion of the structure such that the protective component encloses the portion to protect the structure from damage that may be caused by a natural event. Such natural events that may otherwise cause damage to the property such as the structure may include floods, thunderstorms, hurricanes, hailstorms, tornados, and other natural events or severe weather occurrences.

By way of example, and not as a limitation, a computing device of the intelligent structural protection system may access weather data of a geographic area in which a structure (such as a residential property) is located, predict the likelihood of an occurrence of a natural event, and deploy the protective component. Through the deployment, the protective component encloses a portion of the structure prior to or during the occurrence of the natural event in order to protect the structure from damage that may be caused by the natural event. By way of example, and not as a limitation, the intelligent structural protection system may determine that the likelihood of a hailstorm is 95% and deploy an airbag or an array of airbags to enclose and protect the entirety of the roof of the residential property. The installation, composition, and operation of the deployed airbag may be such that hailstones that contact the airbag may bounce off and fall on the ground adjacent to the residential property, thereby preventing damage that the roof of the property may otherwise suffer had the hailstones directly struck the roof. In another embodiment, the protective component may be a net or a plurality of nets that are arranged on the roof. The installation, composition, and operation of these nets may prevent any water from a storm event from contacting the roof (e.g., due to heavy rainfall), thereby reducing the instances of water damage and increasing the operational life of the roof. A combination of protective components (e.g., nets and airbags) may be installed on other parts of a property as well for the purpose of protecting the other parts of the property such as windows, doors, garages, gutters, or other exposed exterior parts of the property. One or more protective components may be installed on various types of properties, such as residential structures, commercial structures, vehicles, or other properties that may be protected by an insurance claim. The vehicles may include automotive or boating vehicles, and the automotive vehicles may include personal or commercial vehicles, such as cars, trucks, tractors, and other motor and/or electric driven vehicles.

Referring to FIG. 1, an intelligent structural protection solution 101 is shown that may be implemented by an intelligent structural protection system 103 as described herein. It is noted that an implementation of the intelligent structural protection solution 101 by the intelligent structural protection system 103 may include controlling a deployment and retraction of a protective component 102 over one or more portions of a structure such as a house 100. Such a portion may be a roof of the house 100. The house 100 in FIG. 1 is illustrated to include a protective component 102 in a fully deployed position. In embodiments, the deployment of the protective component 102 may be initiated by the intelligent structural protection system 103 upon analyzing historical weather data and real time weather data accessible from a server 112 via a communication network 110.

The server 112 may be an individual server that acquires and collates data from various other servers (not shown) and communicates the collated data to one or more components of the intelligent structural protection system 103. Components of FIG. 1 may also illustrate a sample three-dimensional rendering of a residential property 108 on which a protective component 114 having a customized design 116 is installed. The customized design 116 may be generated by the intelligent structural protection system 103 by analyzing historical and real time weather data and dimensions data of various types of properties. Such data may be accessed from the server 112 via the communication network 110.

Figure 2:
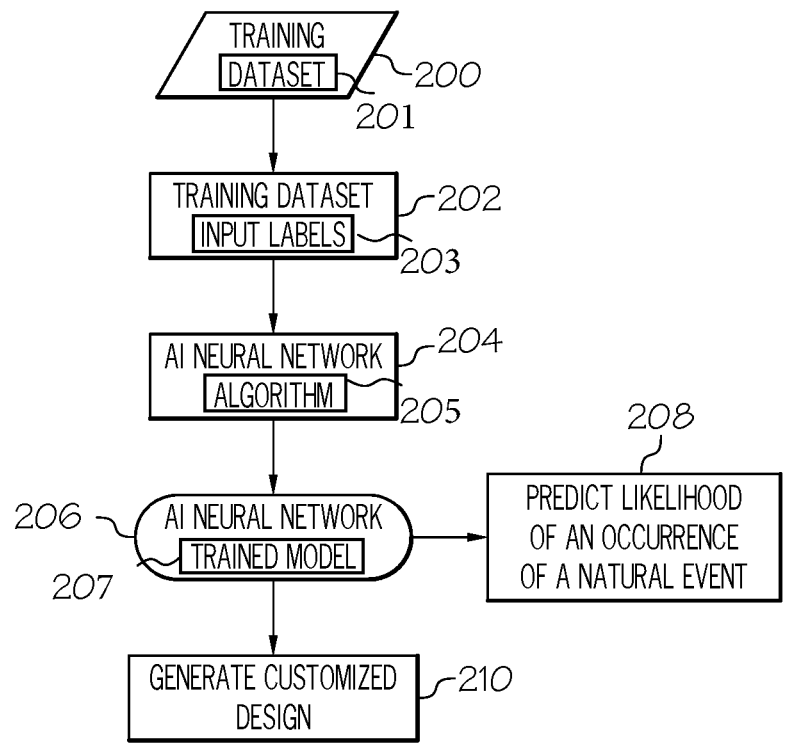
FIG. 2 illustrates a control scheme of the intelligent structural protection solution of FIG. 1 utilizing an artificial intelligence neural network trained model, according to one or more embodiments described and illustrated herein.

FIG. 2 illustrates a flowchart for training and using the intelligent structural protection solution 101 including a block 200 in which a dataset 201 is utilized for training an artificial intelligence network model, and a block 202 in which one or more dataset input labels 203 are associated with the dataset 201 during the use of the dataset 201 for training the artificial intelligence neural network model. In block 204, an artificial intelligence neural network algorithm 205 is trained via blocks 200-202 and applied via an artificial intelligence neural network trained model 207 of block 206. In embodiments, the artificial intelligence neural network trained model 207 of block 206 may be further trained such as through machine learning using the artificial intelligence neural network algorithm 205 of block 204. In block 208, the artificial intelligence neural network trained model 207 may be implemented to predict a likelihood of an occurrence of a natural event associated with a particular time frame. Additionally or alternatively, in block 210, the artificial intelligence neural network trained model 207 may be implemented to generate a customized design 116 (FIG. 1) of a protective component 102.

The artificial intelligence neural network trained model 207 may utilize the artificial intelligence neural network algorithm 205 to generate further training dataset input labels 203 associated with the training dataset 201, such as through machine learning. In embodiments, the training dataset 201 may include historical and real time weather data associated with various geographic areas. For example, the weather data may include temperature data, heat data, pressure data, moisture data, humidity data, and so forth associated with these geographic areas. The training dataset 201 may also include GPS coordinates of these geographic areas. The training dataset 201 may also include the different sources from which such data is gathered, the dates, times, and so forth, associated with such data. The training dataset 201 may include dimensions data associated with various properties, including but not limited to commercial vehicles, passenger vehicles, trains, aircraft, residential property structures, commercial property structures, industrial facilities such as warehouses, grain storage facilities including grain elevators, aircraft hangers, and so forth. Other types of properties are also contemplated.

All or parts of the training dataset may be raw data in the form of images, text, files, videos, and so forth, that may be processed and organized. Such processing and organization may include adding dataset input labels 203 to the raw data so that the artificial intelligence neural network trained model 207 may be trained based on the training dataset 201, the dataset input labels 203, and the artificial intelligence neural network algorithm 205, to efficiently generate various results with an aim to be within a certain accuracy percentage. Such results may be, as described herein, to generate customized designs 116 of a protective component 102 as set forth in block 210, predict a likelihood of an occurrence of a natural event as set forth in block 208, or combinations thereof.

One or more artificial neural networks (ANNs) used for the artificial intelligence neural network trained model 207 and the artificial intelligence neural network algorithm 205 may include connections between nodes that form a directed acyclic graph (DAG). ANNs may include node inputs, one or more hidden activation layers, and node outputs, and may be utilized with activation functions in the one or more hidden activation layers such as a linear function, a step function, logistic (sigmoid) function, a tanh function, a rectified linear unit (ReLu) function, or combinations thereof. ANNs are trained by applying such activation functions to training data sets to determine an optimized solution from adjustable weights and biases applied to nodes within the hidden activation layers to generate one or more outputs as the optimized solution with a minimized error.

In machine learning applications, new inputs may be provided (such as the generated one or more outputs) to the ANN model as training data to continue to improve accuracy and minimize error of the ANN model. The one or more ANN models may utilize one to one, one to many, many to one, and/or many to many (e.g., sequence to sequence) sequence modeling.

The intelligent structural protection system 103 described herein may utilize one or more ANN models as understood to those skilled in the art or as yet-to-be-developed to generate results as described in embodiments herein. Such ANN models may include artificial intelligence components selected from the group that may include, but not be limited to, an artificial intelligence engine, Bayesian inference engine, and a decision-making engine, and may have an adaptive learning engine further comprising a deep neural network learning engine. The one or more ANN models may employ a combination of artificial intelligence techniques, such as, but not limited to, Deep Learning, Random Forest Classifiers, Feature extraction from audio, images, clustering algorithms, or combinations thereof.

In embodiments, a convolutional neural network (CNN) may be utilized. For example, a convolutional neural network (CNN) may be used as an ANN that, in a field of machine learning, for example, is a class of deep, feedforward ANNs that may be applied for audio-visual analysis. CNNs may be shift or space invariant and utilize sharedweight architecture and translation invariance characteristics. Additionally or alternatively, a recurrent neural network (RNN) may be used as an ANN that is a feedback neural network. RNNs may use an internal memory state to process variable length sequences of inputs to generate one or more outputs. In RNNs, connections between nodes may form a DAG along a temporal sequence. One or more different types of RNNs may be used such as a standard RNN, a Long Short Term Memory (LSTM) RNN architecture, and/or a Gated Recurrent Unit RNN architecture.

Figure 3:
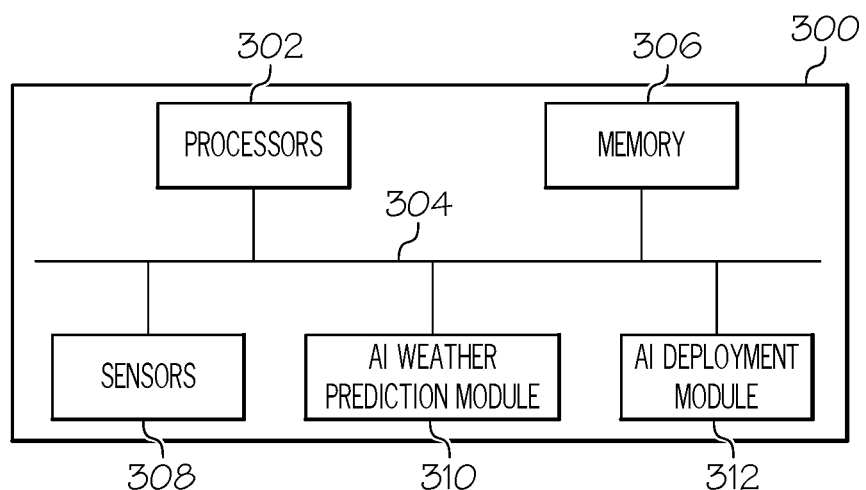
FIG. 3 illustrates a computer implemented intelligent structural protection system for use with the process flows and the intelligent structure protection solution described herein, according to one or more embodiments shown and described herein.
Figure 4A:
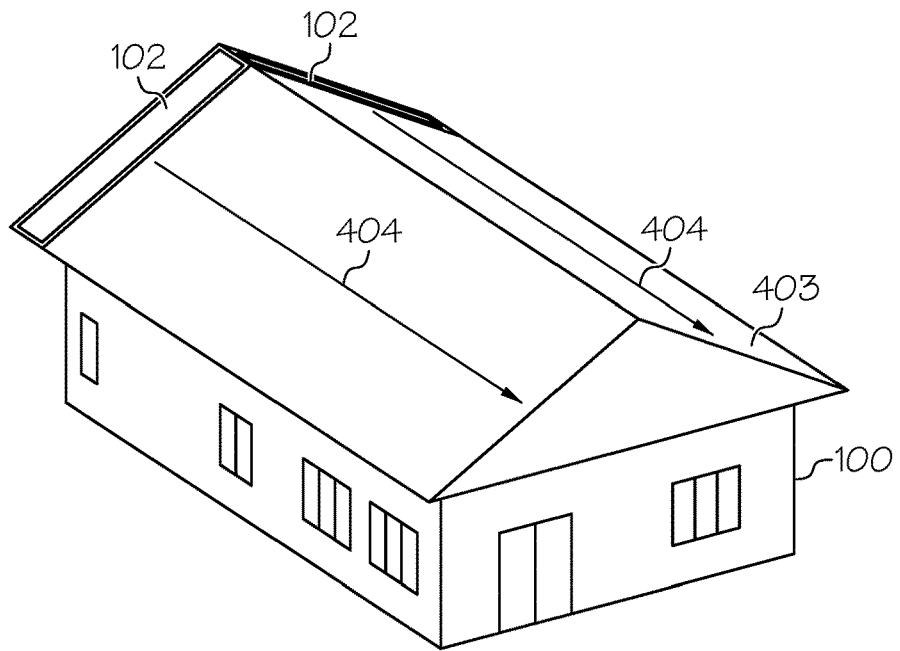
FIG. 4A illustrates an implementation of the intelligent structural protection solution of FIG. 1 with the protective component in an initial position prior to use on a roof of the structure, according to one or more embodiments shown and described herein.
Figure 4B:
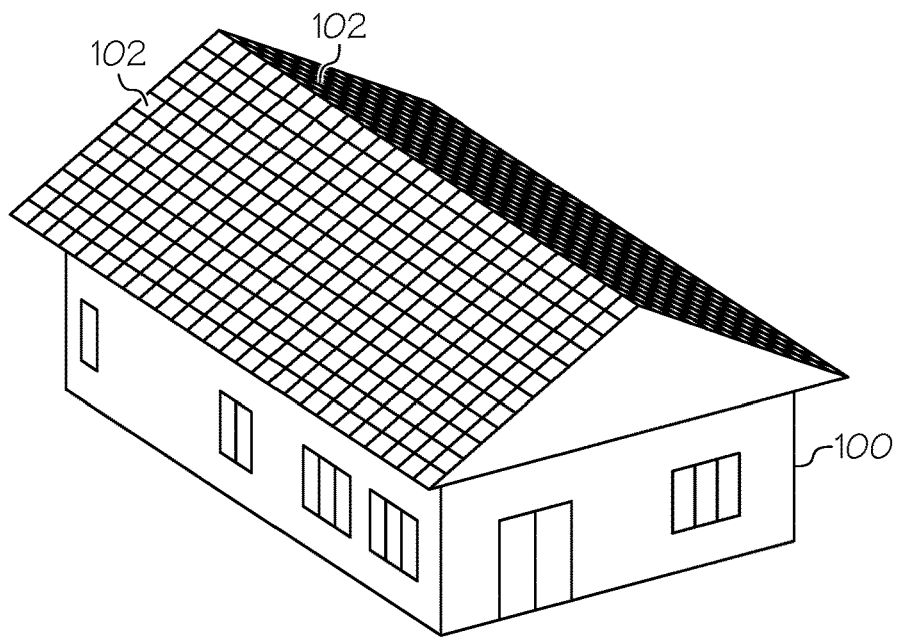
FIG. 4B illustrates an implementation of the intelligent structural protection solution of FIG. 1 with the protective component in a deployed position on the roof of the structure, according to one or more embodiments shown and described herein.
Figure 4C:
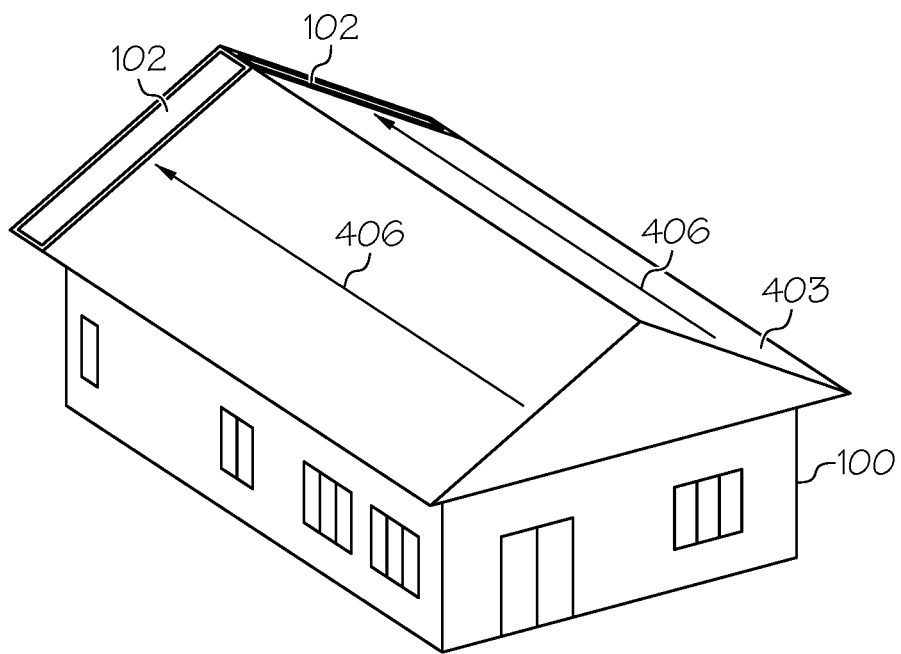
FIG. 4C illustrates an implementation of the intelligent structural protection solution of FIG. 1 with the protective component in a retracted position after use and deployment on the roof of the structure, according to one or more embodiments described and illustrated herein.

FIG. 3 illustrates a computer implemented intelligent structural protection system 103 including one or more computing devices 300, one or more processors 302, a memory 306, one or more sensors 308, an artificial intelligence based weather prediction module 310, and an artificial intelligence based deployment module 312 for use with the process flows described herein, such as the processes 500, 600 of FIGS. 5-6 described further below, and with embodiments of operations of the protective component 102, such as illustrated in FIGS. 4A-4C, also described in greater detail further below.

FIG. 3 illustrates an embodiment of components within a computing device 300 of the intelligent structural protection system 103 of FIG. 1 that may be utilized to implement the intelligent structural protection solution 101 as described herein. While a single computing device 300 is shown, it is contemplated that a plurality of computing devices 300 across the network 110 may be utilized. The computing device 300 may be installed as part of a hardware component that is communicatively coupled to the protective component 102, e.g., via a wired or wireless connection. Additionally, the computing device 300 is configured to, based on manual input or automatically and without user intervention, control the deployment and retraction of the protective component 102 over one or more portions of the house 100. The hardware component in which computing device 300 may be embedded or installed and may be designed such that it is attached or affixed to a portion of the house 100 and connected to the protective component 102 via a wired connection. Alternatively, the computing device 300 may be a smartphone, laptop, or other such device including a software application tool via which a user (e.g., owner of the house 100) may wirelessly control the deployment and retraction of the protective component 102.

In embodiments, the one or more computing devices 300 of the intelligent structural protection system 103 of FIG. 1 may be communicatively coupled with the one or more processors 302, the memory 306, sensors 308, the artificial intelligence based weather prediction module 310, and the artificial intelligence based deployment module 312, the network 110 (FIG. 1), and the server 112 (FIG. 1) via the communication path 304. As used herein, the term "communicatively coupled" means that the coupled components are capable of exchanging data signals with one another such as, for example, electrical signals via conductive medium, electromagnetic signals via air, optical signals via optical waveguides, and the like. The one or more processors 302 may be configured to operate in a distributed computing environment, and may communicate with one or more external devices as part of a wide area network (WAN), such as an intranet, internet, and so forth.

The memory 306 may comprise RAM, ROM, flash memories, hard drives, or any device capable of storing machine readable and executable instructions such that the machine readable and executable instructions can be accessed by the one or more processors 302. The machine readable and executable instructions may comprise logic or algorithm(s) written in any programming language of any generation (e.g., 1GL, 2GL, 3GL, 4GL, or 5GL) such as, for example, machine language that may be directly executed by the one or more processors 302 or assembly language, object-oriented programming (OOP), scripting languages, microcode, etc., that may be compiled or assembled into machine readable and executable instructions and stored on the memory 306. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. In embodiments, the memory 306 stores various types of data, e.g., the data included in the training dataset 201 and the training dataset input labels 203, via a communicatively coupled storage feature such as a database. The memory 306 may store real time weather data, dimensions data, and all of the types of data described herein via such a storage feature.

The sensors 308 may include temperature sensors, pressure sensors, humidity sensors, proximity sensors, particulate matter sensors, moisture sensors, smoke detectors, cameras, motion sensors, and other suitable sensors to detect elements and parameters related to weather events or structures to protect. The artificial intelligence based weather prediction module 310, operating in conjunction with the one or more processors 302, may utilize the artificial intelligence neural network trained model 207 to predict a likelihood of an occurrence of a natural event in a geographic area in which the house 100 is located and generate a customized design 116 of the protective component 102. Additionally, the artificial intelligence based deployment module 312, operating in conjunction with the one or more processors 302, is configured to control the deployment, retraction, and other operations of the protective component 102, such as described with respect to FIGS. 4A-4C further below. The artificial intelligence based weather prediction module 310 and the artificial intelligence based deployment module 312 may be a combination of hardware and software components within the computing device 300.

FIG. 4A illustrates an implementation of the intelligent structural protection solution 101 with the protective component 102 being shown in an initial position prior to use on the roof 403 of the house 100. In the initial position, the protective component 102 is illustrated as contracted. In embodiments, the protective component 102 may be a net that is adhered or attached to a corner of the roof 403 of the house 100. The protective component 102 may also be a net or a plurality of nets positioned on other portions of the house 100, e.g., gutters, roof, and so forth. In these positions, the net may be configured to protect the windows, doors, garages, exterior walls, and other portions of the house 100 from damage that may be caused from natural events such as hailstorms, hurricanes, floods, tornados, heavy rain, and so forth.

The size, configuration, composition, and other characteristics of the protective component 102 such as a net may vary depending on several factors, e.g., the dimensions of the structure upon which the protective component 102 is installed, the type and frequency of natural events occurring in the geographic area in which the structure is located, and other factors to determine characteristics of the protective component 102. In embodiments, the one or more processors 302 (FIG. 3) may generate, using the artificial intelligence neural network trained model 207 (FIG. 2), a first customized design 116 (FIG. 1) for the protective component 102 such as a net for protecting the house 100 from damage that may be caused by hurricanes, and a different second customized design 116 for protecting the house 100 from damage caused by floods and heavy rain. Additionally, the protective component 102 such as a net may be designed to be more durable if the structure is located in a geographic area that experiences floods or heavy rain more frequently relative to another geographic area. Similarly, the size, configuration, and composition of the protective component 102 such as an airbag may also vary depending on the location of the structure and the type and frequency of the natural events occurring at the location.

FIG. 4B illustrates an implementation of the intelligent structural protection solution 101 with the protective component 102 in a deployed position on the roof 403. The artificial intelligence based deployment module 312 may initiate deployment of the protective component 102 such that the protective component 102 may cover the entire roof of the house in a fully deployed position. In an embodiment, the protective component 102 may be a net having a customized design 116 and be attached to the corner of the house, as illustrated in FIG. 4A. In some embodiments, upon activation or initiation of deployment by the artificial intelligence based deployment module 312, the front portion of the net, which may be attached to wheels (not shown), may travel along a track in direction 404 (FIG. 4A) to arrive at the deployed position of FIG. 4B. The speed with which the wheels travel on the track may vary depending on various factors. Other mechanical implementations for moving the net along the direction 404 are also contemplated. For example, if the occurrence of the natural event is predicted to be imminent, the front portion of the net may be moved rapidly along the track in the direction 404. In some embodiments, the speed of deployment of the net may be at a standard speed irrespective of the imminence of the natural event. The nets that are on other parts of the house 100 and designed to protect other portions of the house such as the windows, doors, garages, exterior walls, solar panels, electrical components, and so forth, may also operate in a similar manner.

FIG. 4C illustrates an implementation of the intelligent structural protection solution 101 with the protective component 102 in a retracted position after use and deployment on the roof 403 of the house 100, such as after the protective component 102 has been retracted from a fully deployed position to return to the initial position that corresponds with the retracted position. The artificial intelligence based deployment module 312 may transport the front portion of the net in the direction 406 along the track on the roof 403 such that the net is repositioned in the retracted position. The speed with which the net is retracted may vary.

Figure 5:
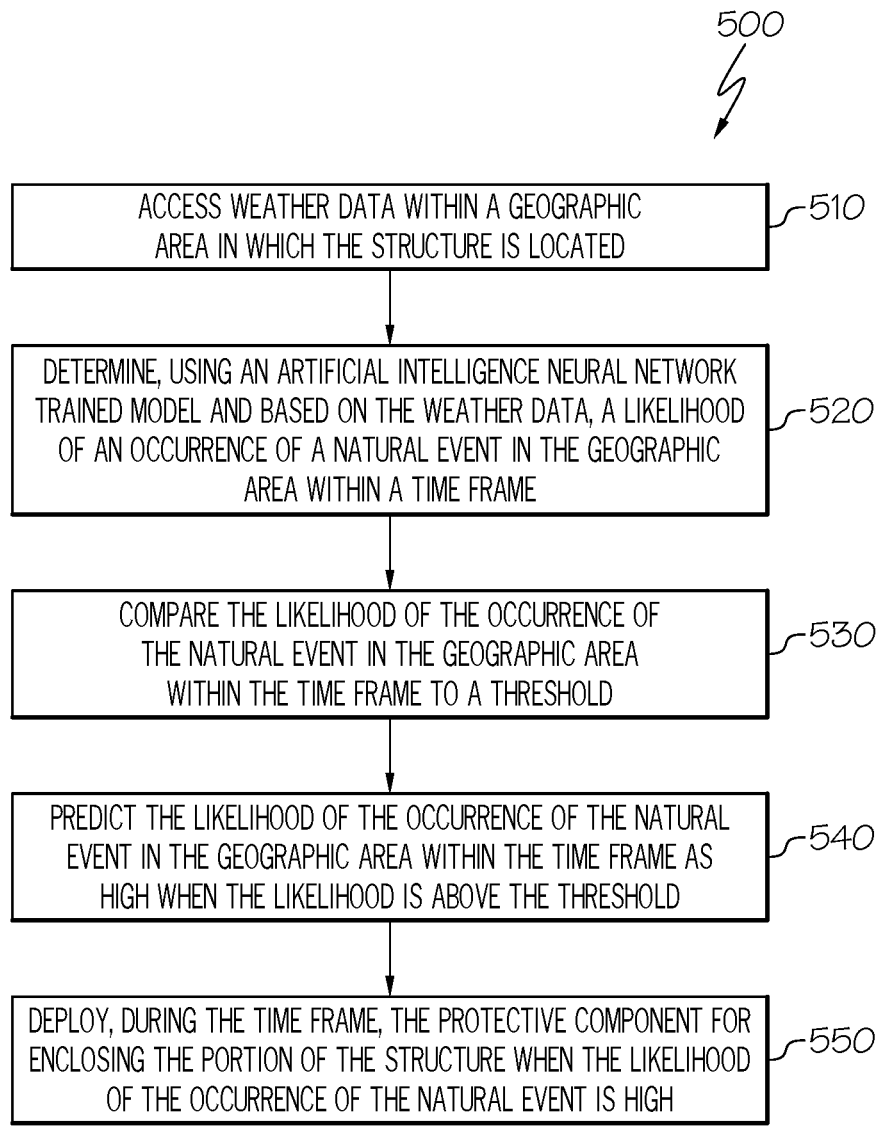
FIG. 5 illustrates a flowchart process of the intelligent structural protection solution of FIG. 1 for deployment of the protective component relative to a structure, according to one or more embodiments described and illustrated herein.

Referring to FIG. 5, a process 500 for the intelligent structural protection solution 101 as may be implemented by the intelligent structural protection system 103, the artificial intelligence neural network trained model 207, and the one or more processors 302 as described herein. The process 500 may be used to predict the likelihood of an occurrence of a natural event as set forth in block 208 of FIG. 2. Referring again to FIG. 5, in block 510, weather data within a geographic area in which a structure is located is accessed by the one or more processors 302 of the intelligent structural protection system 103. By way of example, and not as a limitation, the structure may be a residential property such as the house 100 as depicted in FIG. 1. Alternatively, the structure may be a commercial property such as, e.g., a warehouse, an aircraft hanger, an industrial facility, etc. The structure may also be a vehicle such as an automobile, an aircraft, a boat, etc.

Additionally, a geographic area may refer to a standard metropolitan area, e.g., a densely populated area that includes a city and the surrounding areas, multiple metropolitan areas within a state, metropolitan areas across multiple states, etc. The one or more processors 302 may determine the geographic area in which the structure is located using GPS coordinates. By way of an example, and not as a limitation, weather data may include temperature data, heat data, pressure data, moisture data, humidity data, and so forth associated with the geographic area. Such weather data may be accessed from public, private, and/or governmental sources. As non-limiting examples, weather data may be accessed, in real time, from National Oceanic and Atmospheric Administration (NOAA), from the databases of insurance providers, national and local television channels such as the Weather Channel, NBC, ABC, or other available channels able to provide weather data for a geographic region. Additionally, historical weather data may also be accessed from NOAA, insurance providers, and national and local television channels. The accessed real time and historical weather data may be stored in the storage feature associated with the memory 306 of the intelligent structural protection system 103.

In block 520, the accessed weather data is analyzed to determine a likelihood of an occurrence of a natural event in the geographical area within a time frame. In block 520, historical weather data may be analyzed and weather data accessed in real time to determine the likelihood of a natural event such as a hurricane, tornado, severe rainfall, hailstorm (and other such natural events) occurring within the geographic area in which the structure is located and within the time frame. In embodiments, the determined likelihood of an occurrence of a natural event may be based on a combination of manual analysis in conjunction with the automated analysis and operation of the artificial intelligence based weather prediction module 310. Alternatively, the likelihood of an occurrence of a natural event may be determined, automatically and without user intervention, by the artificial intelligence based weather prediction module 310 operating in conjunction with the one or more processors 302.

In block 530, the likelihood of the occurrence of the natural event in the geographical area within the time frame is compared to a threshold b. In embodiments, the predictive threshold may be a single value or a range of values from five percent to ninety five percent and the determined likelihood may be compared to the single value or the range of values. It is noted that the comparison may also involve text, alphanumeric characters, etc. In embodiments, the determined likelihood of an occurrence of a natural event may be based on manual analysis combined with the automated analysis of the artificial intelligence based weather prediction module 310. Alternatively, the likelihood of an occurrence of a natural event may be determined, automatically and without user intervention, by the artificial intelligence based weather prediction module 310 operating in conjunction with the one or more processors 302.

In block 540, the artificial intelligence based weather prediction module 310 predicts the likelihood of the occurrence of the natural event as high as defined by when the likelihood determined in block 520 is higher than the determined threshold. In some embodiments, the likelihood may be predicted as high if the likelihood determined in block 520 is equal to or greater than the threshold value. The rules and conditions governing what is a high likelihood may vary. As a non-limiting example, the likelihood of the occurrence of the natural event may be determined to be high if a probability of a thunderstorm, within a 12-72 hour window, is determined to be 75%, a probability of a category 3, 4, or 5 hurricane within a 12-72 hour window is determined to be 65%, and so forth. In other examples, the probability of various other types of natural events such as tsunamis, earthquakes, gale force winds, etc., if determined to be in excess of 70%, may also be representative of a high likelihood of an occurrence of a natural event. Other probability threshold percentages are also contemplated. In embodiments, the one or more processors 302 may output, in real time, the prediction of the likelihood of the occurrence of the natural event onto a display of the computing device 301. In some embodiments, the prediction may be output to a display, in real time, to a user computing device such as a smartphone, a laptop, a desktop, etc. In some embodiments, a user may be able to access a software application tool on the user's smartphone, and the prediction may be output on a display of the smartphone using one or more functionalities of the software application tool. In some embodiments, the prediction may be transmitted, in real time, to the server 112. The server 112 may store, track, and analyze the predictions generated by the artificial intelligence based weather prediction module 310.

In block 550, the artificial intelligence based deployment module 312, operating in conjunction with the one or more processors 302, deploys, during a particular time frame, the protective component 102 for enclosing the portion of the structure for protecting the structure in response to the determination that the likelihood of the natural event is high. For example, the artificial intelligence based deployment module 312, operating in conjunction with the one or more processors 302, may initiate a movement of the protective component 102 such that the protective component 102 may, automatically and without user intervention, cover a portion of the roof of a house 100, as illustrated in FIGS. 1, 4A, 4B, and 4C. In some embodiments, the protective component 102 may be controlled wirelessly controlled by a variety of other parties, e.g., insurance companies, homeowners, local authorities, NOAA, third party services such as security services like ADT of Boca Raton, Florida, USA. The protective component 102 may also function based, in part, on the one or more sensors 308. In embodiments, the movement of the protective component 102 may powered by traditional electricity, solar charged batteries, battery backup, air pressure, wind power, spring located mechanism, a counterweight driven mechanism, or other movement providing elements.

In embodiments, the protective component 102 is an airbag that may be adhered or attached to the side of the house 100 and is in initially in an initial position as a contracted position. Upon deployment, the airbag may expand such that, upon complete expansion in a fully deployed position, the airbag may enclose the entirety of the roof of the house 100 in order to protect the entirety of the roof from damage that may be caused by an occurrence of a natural event. In embodiments, the rate of expansion may vary depending on various factors, e.g., the proximity of the occurrence of the natural event, the frequency of natural events occurring in the geographic area in which the house 100 is located, etc. Alternatively, the airbag may expand at a predefined rate.

Consequently, during the occurrence of the natural event (e.g., hailstorm), hailstones that come in contact with any portion of the expanded airbag may bounce off and fall on the ground adjacent to the house 100. The airbag may be designed such that any portion of the airbag that comes in contact with a hailstone is rigid and durable but also sufficiently flexible to absorb the impact, contract a predefined amount, and expand shortly thereafter, resulting in the propelling of the hailstones away from the airbag. All sections of the airbag may function in this manner. In embodiments, the airbag may be made of waterproof material and designed to sustain temperature variations. In embodiments, an array of airbags may be adhered or attached to different parts of the house 100 and designed to enclose different parts of the roof in order to protect the roof from damage that may be caused by the occurrence of natural events. These airbags may be deployed simultaneously or in a sequential manner.

It is noted that the airbags may operate to protect the roof from other natural events as well, e.g., snowstorms, tornados, hurricanes, heavy rain, floods, and so forth. Additionally, in embodiments, one or more airbags may be attached to gutters, roof, or other parts of the house 100 and, upon deployment, may unfurl, expand downwards, and rest on the ground adjacent to the house 100. In the expanded position, these airbags may protect the windows, doors, garages, exterior walls, and other parts of the house 100 from the natural events described above. In embodiments, after the natural event ends, the airbags may need to be repacked. Alternatively, in some embodiments, the used airbags may need to be removed and replaced with new airbags.

In some embodiments, the protective component 102 is a net as described herein that is adhered or attached to the side of the house 100 and is in initially in an initial position as an contracted position. Upon deployment, the net may expand such that, upon complete expansion in a fully deployed position, the net may enclose and protect the entirety of the roof of the house 100, as described above and illustrated in FIG. 4B. In embodiments, the rate of expansion may vary depending on various factors, e.g., the proximity of the occurrence of the natural event, the frequency of natural events occurring in the geographic area in which the house 100 is located, etc. Alternatively, the net may expand at a predefined rate. The design and configuration of net may be based on, e.g., crisscrossing patterns forming a diamond shape, a square shape, etc. Upon completion of deployment, the net may expand to resemble a shape of a hoberman sphere. In some embodiments, the net may be held in an elevated position using one or more airbags that may be positioned underneath the net and expand at a particular rate. In other embodiments, the net may be manually expanded and positioned such that the net encloses and protects one or more portions of the roof of the house 100 from damage that may be caused by the occurrence of natural events. Additionally, similar to the airbags, the net may be positioned on various portions of the house 100, e.g., gutters, roof, and so forth. Upon deployment, the net may unfurl, expand downwards, and rest on the ground adjacent to the house 100. In the expanded and deployed position, the net may protect the windows, doors, garages, exterior walls, and other parts of the house 100 from the natural events described above.

In embodiments, the artificial intelligence based deployment module 312 may determine, using the artificial intelligence neural network trained model 207 and the weather data, that the occurrence of the natural event has ended. As a non-limiting example, the artificial intelligence based deployment module 312 may, operating in conjunction with the one or more processors 302, analyze real time weather data accessed from the sources described above and data gathered by the one or more sensors 308 (e.g., temperature sensors, pressure sensors, humidity sensors, etc.), and determine that a hailstorm has ended or that the severity of the hailstorm has reduced below a particular threshold.

Upon determining that the natural event has ended, the artificial intelligence based deployment module 312 may retract the protective component. In embodiments, the net may be retracted from the expanded and deployed position to a retracted position corresponding to an initial position, such that both the initial position and the retracted position are in the contracted position as described above and illustrated in FIG. 4C. The retraction may occur automatically and without user intervention and/or may be initiated manually by various parties, e.g., insurance companies, homeowners, local authorities, NOAA, third party services such as security services like ADT.

Figure 6:
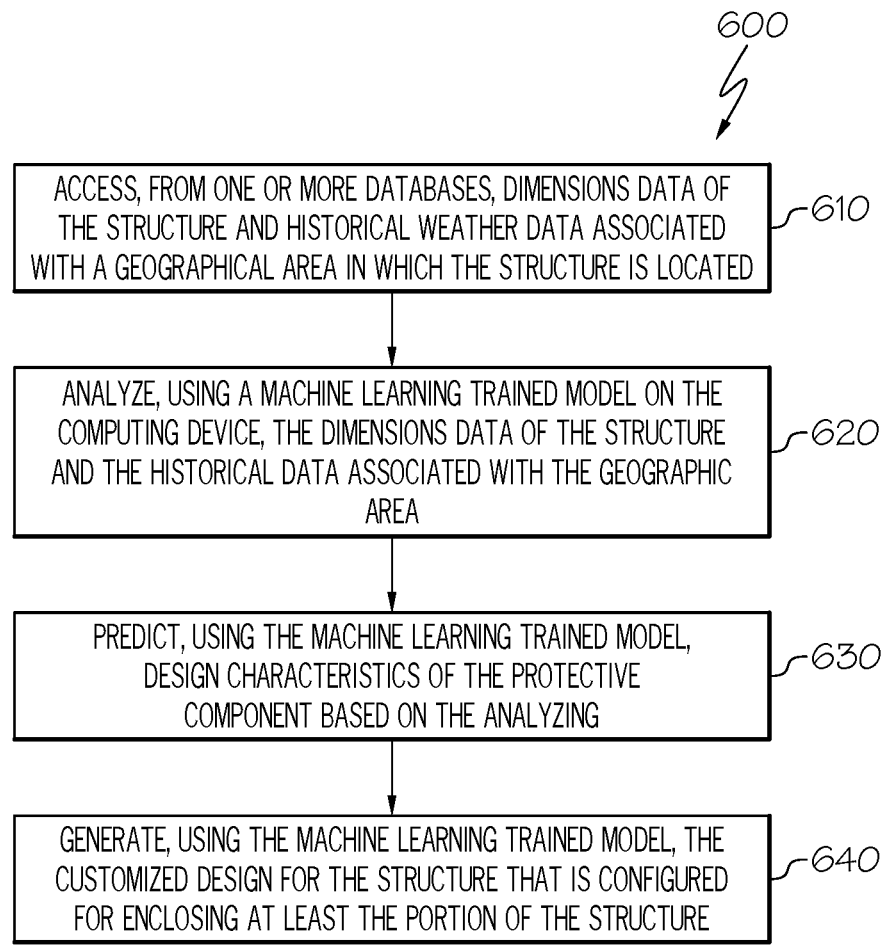
FIG. 6 illustrates a flowchart process of the intelligent structural protection solution of FIG. 1 for generating a customized design of the protective component for a structure, according to one or more embodiments described and illustrated herein.

Referring to FIG. 6, a process 600 is shown for generating a customized design 116 of a protective component 102 for a structure corresponding to block 210 of FIG. 2 using the intelligent structural protection system 103 as described herein. In block 610 of FIG. 6, dimensions data of the structure and historical weather data associated with a geographic area in which the structure is located are accessed. In embodiments, the dimensions data of the structure may be the length, width, thickness, and other such metrics associated with the roof of the house 100, the square footage of the house, the length, width, and thickness of the exterior walls, garage, and other portions of the house 100. Additionally, dimensions data may also include the dimensions of one or more subcomponents of the roof, e.g., length, width, thickness, and so forth, of the shingles of the roof. The dimensions data may also include data associated with the shapes and sizes of various items that are installed on the roof of the house 100, e.g., vents, antennas, solar panels, chimneys, pipes, wires, and so forth. The historical weather data, as described above, may be include historical temperature data, heat data, pressure data, moisture data, humidity data, and so forth, associated with the geographic area. Additionally, the historical weather data may also include data related to historical occurrences of natural events associated with the geographic area. In embodiments, dimensions data associated with structures having a similar shape to the house 100 may also be accessed. After accessing such data, the one or more processors 302 may store all of the dimensions data in the memory 306.

In block 620, the one or more processors 302 may be operable to analyze, using the artificial intelligence neural network trained model, on the computing device 301, the dimensions data of the structure and the historical weather data associated with the geographical area in which the structure is located. For example, the one or more processors 302 may compare the dimensions data of the house 100 in combination with the historical weather data associated with the geographic area in which the house 100 is located with other residential and commercial properties in the same or similar geographical area. These residential and commercial properties may have dimensions that are similar to the house 100. Additionally, in embodiments, the one or more processors 302 may be operable to execute machine-readable instructions to analyze historical occurrences of natural events in and around the geographical areas in which the house 100 and the residential and commercial properties are located, and determine the frequency of these natural events, e.g., frequency of hailstorms, tornados, hurricanes, floods, heavy rainfall, etc. Moreover, the one or more processors 302 be operable to execute machine-readable instructions to may analyze the shapes and sizes of various items that are installed on the roof of the house 100, e.g., vents, antennas, solar panels, chimneys, pipes, wires, and so forth.

Based on the above analysis, the one or more processors 302, operating in conjunction with the artificial intelligence based weather prediction module 310, may be operable to predict the type and likelihood of one or more natural events that are most likely to occur in the geographic area in which the structure is located. For example, the one or more processors 302, operating in conjunction with the artificial intelligence based weather prediction module 310, may be operable to predict that a particular geographic area is more likely to experience hailstorms, while another geographic area is more likely to experience hurricanes and floods. The one or more processors 302 may then be operable to analyze the dimensions of various parts of the structure and assess the suitability of the structure (e.g., the house 100) to resist potential damage that may be caused by various natural events.

In block 630, the one or more processors 302 may be operable to predict, using the artificial intelligence neural network trained model 207, design characteristics of the protective component based on the analyzing in block 620. The one or more processors 302 may be operable to predict the design characteristics of a protective component 102 including, but not limited to, the type of the protective component 102, the dimensions of the protective component 102, the shape of the protective component 102, and so forth. These design characteristics may also ensure that the protective component design and installation does not damage any existing objects currently installed on a structure, e.g., vents, antennas, solar panels, chimneys, pipes, wires, and so forth.

The one or more processors 302 may be operable to predict the design characteristics of the protective component 102 that is suited for protecting and improving the working life of the structure and all objects installed thereupon. For example, the one or more processors 302 may be operable to determine that the protective component 102 that is suitable for protecting the structure (e.g., the house 100) located in a geographic area that frequently experiences hailstorms is an airbag, while a net may be determined to be more suitable as the protective component 102 for an area that experiences floods or heavy rain. The one or more processors 302 may also be operable to predict the precise dimensions of the airbag or the net, and the installation instructions of the protective component 102, which includes the portions of the house 100 where the airbag or net should be installed, e.g., the gutters, roof, side of the house, and so forth.

In block 640, the one or more processors 302 may be operable to generate, using the artificial intelligence neural network trained model 207, a customized design 116 for the protective component 102 that is configured to enclose at least a portion of the structure for protecting the structure from damage that may be caused by a natural event. The generation of the customized design 116 may include a three-dimensional rendering of the structure (e.g., the house 100) upon which the protective component 102 having the customized design (as described in block 620) is installed. For example, a three-dimensional rendering of a net installed on select portions of the house 100 may be output onto a display (not shown) such as a graphical user interface (GUI) of the computing device 301. The rendering may include the net shown at an initial position, such as a contracted position as illustrated in FIG. 4A. Thereafter, the rendering may show the net in an expanded and deployed position as illustrated in FIG. 4B. In embodiments, the three-dimensional rendering may be an animation that displays the movement of the protective component from the contracted to the expanded position. The animation may be an automatically presented animation that is not provided with animation control features or an animation that is paused, forwarded, or rewinded, or operated with various animation control features.

The intelligent structural protection system 103 described herein aids to eliminate or mitigate burdensome costs that are borne by insurance companies as a result of property damage suffered by various property owners and payments made to insurance claims associated with the property and based on said damage. The intelligent structural protection system 103 is configured to deploy the protective component 102 as described herein relative to one or more portions of a structure to thereby mitigate or prevent such property damage that may be otherwise suffered by a structure by direct impact to the structure during an occurrence of a natural event, e.g., floods, hurricanes, hailstorms, tornados, etc.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" or "programmed" in a particular way, to embody a particular property, or to function in a particular manner, are structural recitations, as opposed to recitations of intended use.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present disclosure, it is noted that this term is introduced in the claims as an open-ended transitional phrase that is used to introduce a recitation of a series of characteristics of the structure and should be interpreted in like manner as the more commonly used open-ended preamble term "comprising."

Aspects Listing

Aspect 1. An intelligent structural protection system may include a structure comprising a portion, a protective component, one or more processors, and one or more memory components communicatively coupled to the one or more processors. The machine readable instructions may cause the intelligent structural protection system to perform at least the following when executed by the one or more processors: access weather data within a geographic area in which the structure is located, determine, using an artificial intelligence neural network trained model and based on the weather data, a likelihood of an occurrence of a natural event in the geographic area within a time frame, compare the likelihood of the occurrence of the natural event in the geographic area within the time frame to a threshold, predict the likelihood of the occurrence of the natural event in the geographic area within the time frame as high as defined by when the likelihood is above the predictive threshold, deploy, during the time frame, the protective component for protecting the portion of the structure when the likelihood of the natural event is high.

Aspect 2. The intelligent structural protection system of Aspect 1, wherein the machine readable instructions further cause the intelligent structural protection system to perform at least the following when executed by the one or more processors: determine an end of the occurrence of the natural event.

Aspect 3. The intelligent structural protection system of Aspect 2, wherein the machine readable instructions further cause the intelligent structural protection system to perform at least the following when executed by the one or more processors: retract the protective component responsive to determining the end of the occurrence.

Aspect 4. The intelligent structural protection system of any of Aspect 1 to Aspect 3, wherein the weather data includes one or more of temperature data, heat data, pressure data, moisture data, and humidity data associated with the geographic area in which the structure is located.

Aspect 5. The intelligent structural protection system of any of Aspect 1 to Aspect 4, wherein the natural event comprises a hurricane, a hail storm, a tornado, or a flood.

Aspect 6. The intelligent structural protection system of any of Aspect 1 to Aspect 5, wherein the structure is a building, a vehicle, a boat, or an aircraft.

Aspect 7. The intelligent structural protection system of any of Aspect 1 to Aspect 6, wherein the machine readable instructions further cause the intelligent structural protection system to perform at least the following when executed by the one or more processors: determine the geographic area using GPS coordinates.

Aspect 8. A method for deployment of a protective component in relation to a structure may include accessing weather data within a geographic area in which the structure is located, determining, using an artificial intelligence neural network trained model and based on the weather data, a likelihood of an occurrence of a natural event in the geographic area within a time frame, comparing the likelihood of the occurrence of the natural event in the geographic area within the time frame to a threshold, predicting the likelihood of the occurrence of the natural event in the geographic area within the time frame is high as defined by when the likelihood is above the threshold, and deploying, during the time frame, the protective component for protecting a portion of the structure when the likelihood of the natural event is high.

Aspect 9. The method of Aspect 8, wherein the weather data includes one or more of temperature data, heat data, pressure data, moisture data, and humidity data associated with the geographic area in which the structure is located.

Aspect 10. The method of Aspect 8 or Aspect 9, wherein the natural event comprises a hurricane, a hail storm, a tornado, or a flood.

Aspect 11. The method of any of Aspect 8 to Aspect 10, wherein the structure is a building, a vehicle, a boat, or an aircraft.

Aspect 12. The method of any of Aspect 8 to Aspect 11, further comprising determining the geographic area using GPS coordinates.

Aspect 13. The method of any of Aspect 8 to Aspect 12, further comprising determining an end of the occurrence of the natural event.

Aspect 14. The method of Aspect 13, further comprising retracting the protective component responsive to determining the end of the occurrence.

Aspect 15. A method for generating a customized design of a protective component for a structure using a computing device, the structure comprising a portion. The method may include accessing, from one or more databases, dimensions data of the structure and historical weather data associated with a geographic area in which the structure is located, analyzing, using an artificial intelligence neural network trained model on the computing device, the dimensions data of the structure and the historical weather data associated with the geographic area, predicting, using the machine learning trained model, design characteristics of the protective component based on the analyzing, and generating, using an artificial intelligence neural network trained model, the customized design for the structure that is configured for protecting at least the portion of the structure.

Aspect 16. The method of Aspect 15, wherein the historical weather data includes one or more of historical occurrences of natural events, historical temperature data, historical heat data, historical pressure data, historical moisture data, and historical humidity data associated with the geographic area in which the structure is located.

Aspect 17. The method of Aspect 16, wherein the one or more historical occurrences of natural events comprises historical data relating to occurrences of a hurricane, a hail storm, a tornado, or a flood.

Aspect 18. The method of any of Aspect 15 to Aspect 17, wherein the dimensions data of the structure includes a shape of a roof of the structure, contours of the roof of the structure, or angles associated with the roof of the structure.

Aspect 19. The method of any of Aspect 15 to Aspect 18, further comprising determining the geographic area using GPS coordinates.

Aspect 20. The method of any of Aspect 15 to Aspect 19, wherein the structure is a building, a vehicle, a boat, or an aircraft.

What is claimed is:

1. An intelligent structural protection system comprising:
   a structure comprising a portion, wherein the portion comprises at least a portion of a roof of the structure;
   a protective roof component;
   one or more processors;
   one or more memory components communicatively coupled to the one or more processors; and
   machine readable instructions stored in the one or more memory components that cause the intelligent structural protection system to perform at least the following when executed by the one or more processors:
   access weather data within a geographic area in which the structure is located;
   determine, using an artificial intelligence neural network trained model and based on the weather data, a likelihood of an occurrence of a natural event in the geographic area within a time frame;
   compare the likelihood of the occurrence of the natural event in the geographic area within the time frame to a threshold;
   predict the likelihood of the occurrence of the natural event in the geographic area within the time frame as high as defined by when the likelihood is above the threshold; and
   deploy, during the time frame, the protective roof component, for protecting the portion of the structure when the likelihood of the occurrence of the natural event is high.

2. The intelligent structural protection system of claim 1, wherein the machine readable instructions further cause the intelligent structural protection system to perform at least the following when executed by the one or more processors: determine an end of the occurrence of the natural event.

3. The intelligent structural protection system of claim 2, wherein the machine readable instructions further cause the intelligent structural protection system to perform at least the following when executed by the one or more processors:

retract the protective roof component responsive to determining the end of the occurrence.

4. The intelligent structural protection system of claim 1, wherein the weather data includes one or more of temperature data, heat data, pressure data, moisture data, and humidity data associated with the geographic area in which the structure is located.

5. The intelligent structural protection system of claim 1, wherein the natural event comprises a hurricane, a hail storm, a tornado, or a flood.

6. The intelligent structural protection system of claim 1, wherein the structure is a building, a vehicle, a boat, or an aircraft.

7. The intelligent structural protection system of claim 1, wherein the machine readable instructions further cause the intelligent structural protection system to perform at least the following when executed by the one or more processors:

determine the geographic area using GPS coordinates.

8. A method for deployment of a protective roof component in relation to a structure comprising:

accessing weather data within a geographic area in which the structure is located;

determining, using an artificial intelligence neural network trained model and based on the weather data, a likelihood of an occurrence of a natural event in the geographic area within a time frame;

comparing the likelihood of the occurrence of the natural event in the geographic area within the time frame to a threshold;

predicting the likelihood of the occurrence of the natural event in the geographic area within the time frame is high as defined by when the likelihood is above the threshold; and deploying, during the time frame, the protective roof component for protecting a portion of the structure when the likelihood of the occurrence of the natural event is high, wherein the portion comprises at least a portion of a roof of the structure.

9. The method of claim 8, wherein the weather data includes one or more of temperature data, heat data, pressure data, moisture data, and humidity data associated with the geographic area in which the structure is located.

10. The method of claim 8, wherein the natural event comprises a hurricane, a hail storm, a tornado, or a flood.

11. The method of claim 8, wherein the structure is a building, a vehicle, a boat, or an aircraft.

12. The method of claim 8, further comprising determining the geographic area using GPS coordinates.

13. The method of claim 8, further comprising determining an end of the occurrence of the natural event.

14. The method of claim 13, further comprising retracting the protective roof component responsive to determining the end of the occurrence.

* * * * *